US008395469B2

(12) United States Patent
Skibinski et al.

(10) Patent No.: US 8,395,469 B2
(45) Date of Patent: Mar. 12, 2013

(54) MULTI-PHASE TRANSFORMER

(75) Inventors: Gary L. Skibinski, Milwaukee, WI (US); Lixiang Wei, Whitefish Bay, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 112 days.

(21) Appl. No.: 12/901,251

(22) Filed: Oct. 8, 2010

(65) Prior Publication Data

US 2012/0086532 A1 Apr. 12, 2012

(51) Int. Cl.

| | |
|---|---|
| ***H01F 30/12*** | (2006.01) |
| ***H01F 21/02*** | (2006.01) |
| ***H02M 5/00*** | (2006.01) |
| ***H02M 5/06*** | (2006.01) |
| ***H02M 5/14*** | (2006.01) |

(52) U.S. Cl. ............ 336/5; 336/148; 363/148; 363/152; 363/153

(58) Field of Classification Search ................ 336/5, 10, 336/12, 148, 154, 155, 156; 363/148, 152, 363/153, 154, 155, 156

See application file for complete search history.

(56) References Cited

U.S. PATENT DOCUMENTS

| | | | | |
|---|---|---|---|---|
| 2,517,396 | A * | 8/1950 | Logan | 363/172 |
| 3,175,142 | A * | 3/1965 | Rawcliffe | 318/773 |
| 3,392,320 | A * | 7/1968 | Kennedy | 363/1 |
| 4,320,328 | A * | 3/1982 | Rudolph, Jr. | 318/431 |
| 4,439,823 | A * | 3/1984 | Gyugyi et al. | 363/161 |
| 4,567,423 | A * | 1/1986 | Dobsa et al. | 322/58 |
| 5,455,759 | A * | 10/1995 | Paice | 363/126 |
| 6,191,968 | B1 * | 2/2001 | Paice | 363/148 |
| 6,249,443 | B1 * | 6/2001 | Zhou et al. | 363/5 |
| 6,335,872 | B1 * | 1/2002 | Zhou et al. | 363/154 |
| 6,343,021 | B1 * | 1/2002 | Williamson | 363/8 |
| 6,385,064 | B1 * | 5/2002 | Zhou et al. | 363/44 |
| 6,861,936 | B2 * | 3/2005 | Kamath | 336/148 |
| 7,233,506 | B1 * | 6/2007 | Paice | 363/45 |
| 7,274,280 | B1 | 9/2007 | Paice | |
| 7,863,766 | B2 * | 1/2011 | Abolhassani et al. | 290/44 |

* cited by examiner

*Primary Examiner* — Mohamad Musleh
*Assistant Examiner* — Joselito Baisa
(74) *Attorney, Agent, or Firm* — Fletcher Yoder, P.C.; Alexander R. Kuszewski; John M. Miller

(57) ABSTRACT

A transformer for converting 3 phase AC to 9 phase AC power is provided. The transformer includes first, second and third coils, each coil having a plurality of serial windings coupled together to form a polygon. The transformer further includes first, second and third input terminals each linked to a respective winding of the first, second and third coils. The input terminals are configured to receive a first, second and third phases of input AC power and at least one selected input terminal of the first, second and third input terminals is adjustable to alter a number of turns of the respective winding of the corresponding first, second or third coil on either side of the selected input terminal. The transformer further includes first through ninth output terminals linkable to first through ninth output power lines.

20 Claims, 5 Drawing Sheets

MULTI-PHASE TRANSFORMER

BACKGROUND

The present invention relates generally to power electronic devices such as those used in power conversion systems. More particularly, the present invention relates to transformers configured to convert 3 phase AC power to 9 phase AC power without the use of extra windings.

Multi-phase transformers are configured to convert a 3-phase AC input power to a multi-phase (e.g. 9 phase) AC output power. Such transformers are typically designed to provide a desired output AC power. The output AC power generated by the transformer may be rectified or filtered before being supplied to a load.

However, in some situations, the output voltage provided to the load is lower than the output power generated by the transformer due to losses in the output devices such as rectifiers, output filters and/or long cable lengths. One way to reduce such losses is to lower the cable resistance. However, such cables can increase the overall cost of a system.

Another technique to maintain the desired output power at a load is to include a step-up transformer to compensate for the output voltage drops. Typically, a buck or boost transformer is externally coupled to the multi-phase transformer. In some systems, an extra winding is added to the transformer. However, these approaches increase the overall cost and the size of the transformer.

Therefore, there is a need to design a multi-phase transformer that can operate as a step-up or step-down transformer without increasing the size or cost of the overall system.

BRIEF DESCRIPTION

Briefly, according to one embodiment of the invention, a transformer for converting 3 phase AC to 9 phase AC power is provided. The transformer includes first, second and third coils, each coil having a plurality of serial windings coupled together to form a polygon. The transformer further includes first, second and third input terminals each linked to a respective winding of the first, second and third coils. The input terminals are configured to receive a first, second and third phases of input AC power and at least one selected input terminal of the first, second and third input terminals is adjustable to alter a number of turns of the respective winding of the corresponding first, second or third coil on either side of the selected input terminal. The transformer further includes first through ninth output terminals linkable to first through ninth output power lines.

In another embodiment, a transformer for converting 3 phase AC to 9 phase AC power includes first, second and third coils, each coil having a plurality of serial windings coupled together to form a hexagon. Each coil comprises five separate windings including first, second, third, fourth and fifth windings. The transformer further includes first, second and third input terminals each linked to a selected winding of one of the first, second and third coils, respectively and configured to receive a first, second and third phases of input power. At least one of the first, second and third input terminals is adjustable to alter a turns ratio of the selected winding of the corresponding first, second or third coil. The transformer further includes first through ninth output terminals linkable to the first through ninth output power lines.

In another embodiment, a method for making a transformer for converting 3 phase AC to 9 phase AC power is provided. The method comprises linking first, second and third coils, each coil having a plurality of serial windings coupled together to form a transformer, and each coil comprises five separate windings including first, second, third, fourth and fifth windings. The method further includes adjusting a voltage ratio of the transformer by altering a number of a turns of at least a selected one of the windings of the first, second and third coils and coupling 9 output phase lines to first through ninth output terminals of the transformer.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
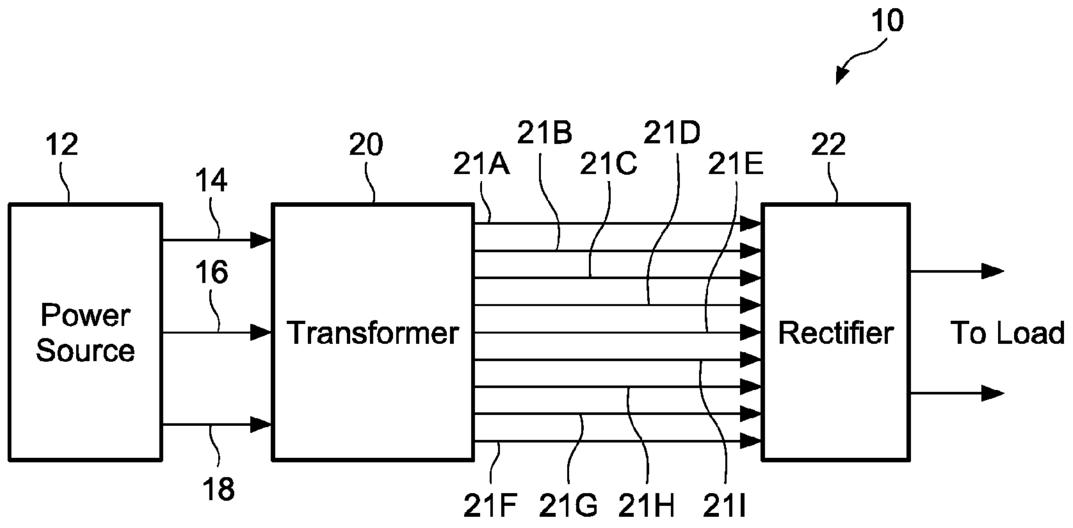
FIG. 1 is a block diagram of an exemplary embodiment of a power system implemented according to aspects of the present technique.

Turning now to the drawings, and referring first to FIG. 1, a power system 10 is illustrated. Power system 10 comprises power source 12, transformer 20 and rectifier 22. The output power generated by the power system is provided to a load. Examples of loads include motors, drives, and so forth. Each block is described in further detail below.

It should be noted that references in this specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Power source 12 is configured to generate or provide 3 phase AC power, and in many cases may comprise the utility grid. The 3 phase AC power may be provided to various electrical devices such as transformer 20. Transformer 20 is coupled to the power source 12 and receives 3 phase AC power. The 3 phase AC power is provided to 3 separate input terminals 14, 16 and 18 as first, second and third phases. Transformer 20 is configured to convert 3 phase AC power to 9 phase AC output power. In the illustrated embodiment, the output power is provided to rectifier 30 via 9 output lines 21-A through 21-I, respectively.

Rectifier 30 is configured to convert the 9 phase output AC power to corresponding DC voltage across a DC bus. In one embodiment, the rectifier includes a switch-based bridge including two switches for each AC voltage phase which are each linked to the DC bus. The switches are alternately opened and closed in a timed fashion that causes rectification of the 9 phase AC output power generated by the transformer. The rectified output DC power may be provided to a load. Other types and topologies of rectifiers, and indeed other uses for the 9 phase output may be employed.

As described above, the transformer 20 is configured to convert 3 phase AC power to 9 phase AC power. The components used to construct transformer 20 is described in further detail below with reference to FIG. 2.

Figure 2:
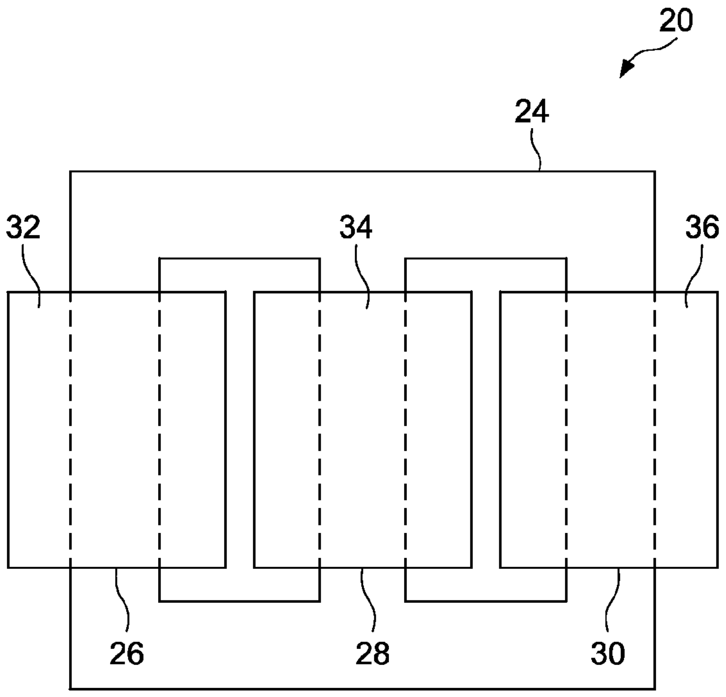
FIG. 2 is a front view of a core and coils of transformer according to the present invention.

FIG. 2 is a block diagram illustrating one embodiment of a transformer implemented according to aspects of the present techniques. The transformer 20 is constructed on a laminated core 24. In one embodiment, the laminated core is made of electrical grade steel. The laminated core 24 includes 3 poles 26, 28 and 30 that form a path for magnetic flux. The core 24 preferably has no other magnetic flux paths than the 3 traversing poles such that the flux flowing through one pole (e.g., pole 34) return upwards through the other two poles (e.g., pole 32 and 36).

The poles 26, 28 and 30 pass through first, second and third coil 32, 34 and 36 respectively. In one embodiment, each coil includes several windings coupled together in series. In one embodiment, each coil has first, second, third, fourth and fifth windings. Each winding may be constructed using a single winding specific wire.

Alternatively, several series windings may be constructed using a single wire or all of the windings may be constructed using a single wire. In one embodiment, all of the windings have a similar construction, the distinction being primarily in the number of turns that are included in each winding. The manner in which the windings are linked to form a transformer is described in further detail below.

Figure 3:
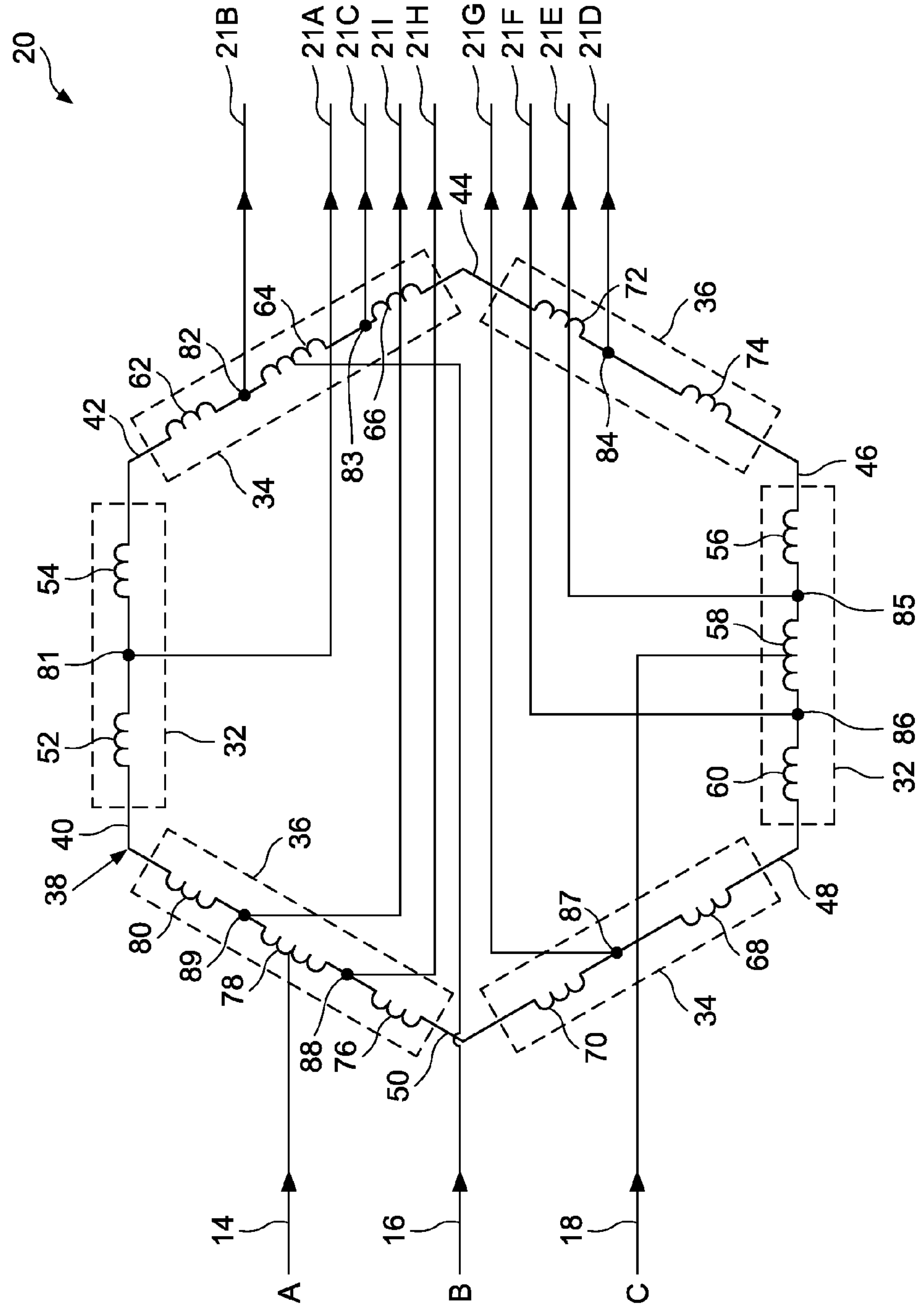
FIG. 3 is a circuit diagram of an exemplary embodiment of a transformer implemented according to aspects of the invention.

FIG. 3 is an electrical circuit diagram of transformer 20 implemented according to aspects of the present techniques. The transformer 20 includes 3 coils 32, 34 and 36 coupled to each other to form a hexagon 38. Further each coil has a plurality of windings. In the illustrated embodiment, each coil includes five separate windings and is positioned as described below.

As can be seen in FIG. 3, the first coil 32 includes windings 52 and 54 formed on leg 40 of the hexagon 38. The first coil further includes windings 56, 58 and 60 formed on the fourth leg 46 of the hexagon 38. Similarly, the second coil 34 includes windings 62, 64 and 66 formed on the second leg 42 of the hexagon 38. The second coil 34 further includes windings 68 and 70 on the fifth leg 48 of the hexagon 38. Lastly the third coil 36 includes windings 72 and 74 on the third leg 44 of the hexagon 38, and further includes windings 76, 78 and 80 on the sixth leg 50 of the hexagon 38.

The input terminals 14, 16 and 18 are configured to receive a first, second and third phases or power, represented generally by the letters A, B and C. The 3 input terminals are each coupled to first, second and third coils respectively. More specifically, the input terminal 14 is coupled to winding 78 of coil 36. Similarly, input terminal 16 is coupled to winding 64 of coil 34, and input terminal 18 is coupled to winding 58 of to coil 32.

Transformer 20 includes 9 output terminals 21-A through 21-I as shown. The first output terminal 21-A is positioned at node 81 between the first winding 52 and second winding 54 of the first coil 32. The second output terminal 21-B is positioned at node 82 between first winding 62 and second winding 64 of the second coil 34. The third output terminal 21-C is positioned at node 83 between the second winding 64 and third winding 66 of the second coil 34.

The fourth output terminal 21-D is positioned at node 84 between the first winding 72 and second winding 74 of the third coil 36. The fifth output terminal 21-E is positioned at node 85 between the third winding 56 and fourth winding 58 of the first coil 32. The sixth output terminal 21-F is positioned at node 86 between the fourth winding 58 and fifth winding 60 of the first coil 32.

The seventh output terminal 21-G is positioned at node 87 between the fourth winding 68 and fifth winding 70 of the second coil 34. The eighth output terminal 21-H is positioned at node 88 between the third winding 76 and fourth winding 78 of the third coil 36. The ninth output terminal 21-I is positioned at node 89 between the fourth winding 78 and fifth winding 80 of the third coil 36.

In the embodiment illustrated in FIG. 3, input terminal 18 is adjustable to alter a number of turns of the winding 58 of first coil 32 on either side of the terminal. By adjusting the number of turns in the windings, a voltage ratio of the transformer is adjusted. Thus, the voltage ratio of the transformer is adjustable without the use of extra windings.

Figure 4:
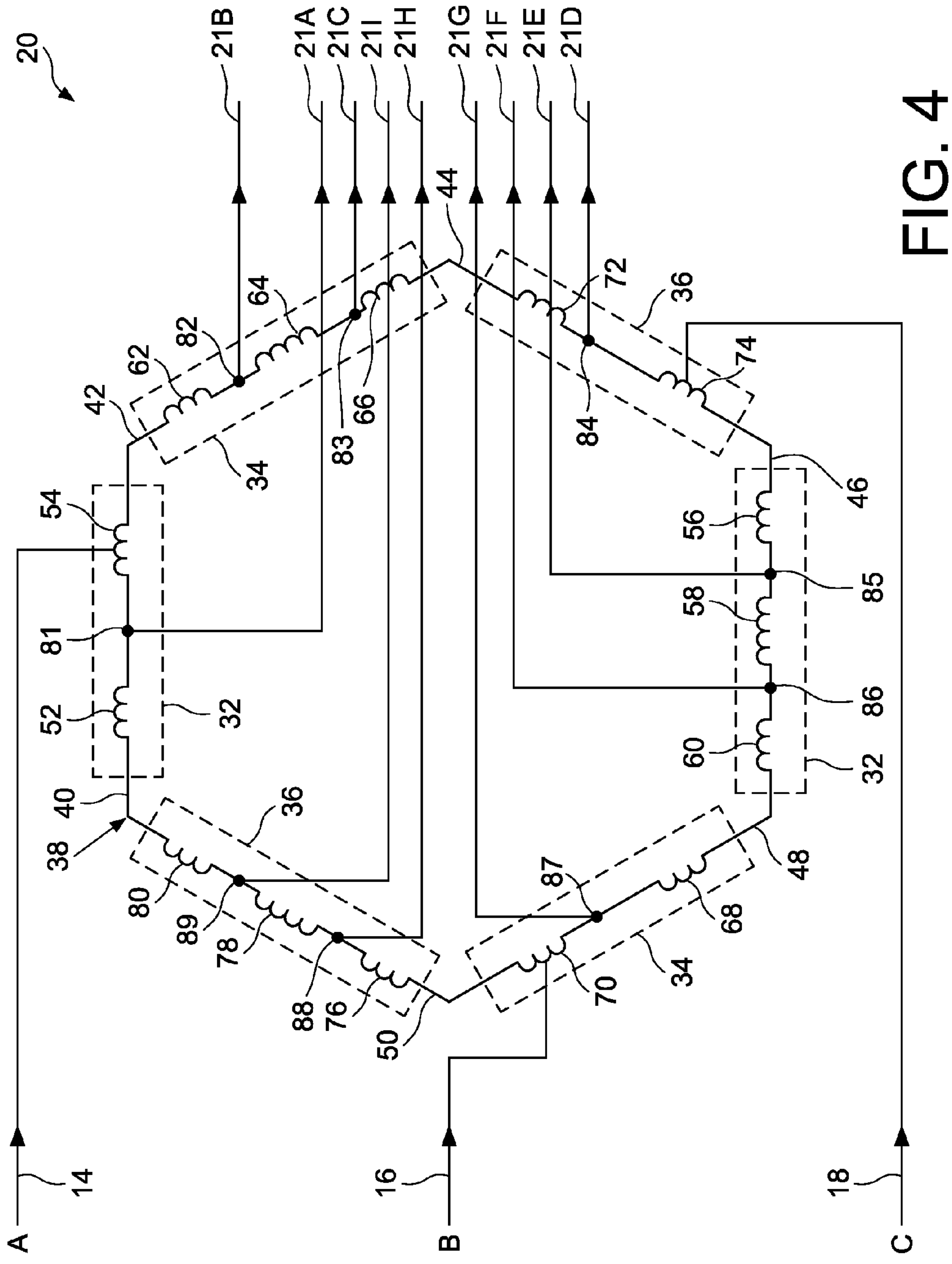
FIG. 4 is a circuit diagram of an alternate embodiment of a transformer implemented according to aspects of the invention.

FIG. 4 illustrates an alternate embodiment of the transformer 20. In the illustrated embodiment, the input terminal 14 is coupled to the first coil 32. Input terminal 16 is coupled to second coil 34 and input terminal 18 is coupled to third coil 36. More specifically, the input terminal 14 is coupled to the second winding 54 of first coil 32 and is configured to alter a number of turns of the winding 54 on either side of the input terminal. Similarly, input terminal 16 is coupled to fifth winding 70 of second coil 34 and is configured to alter a number of turns of the winding 70 on either side of the input terminal. Further, input terminal 18 is coupled to second winding 74 of third coil 36 and is configured to alter a number of turns of the winding 74 on either side of the input terminal.

The voltage ratio of the transformer is thus adjusted by adjusting the number of turns in windings 54, 70 and 74. It may be noted that the voltage ratio may be adjusted to operate the transformer as a step-up transformer or a step down transformer.

Figure 5:
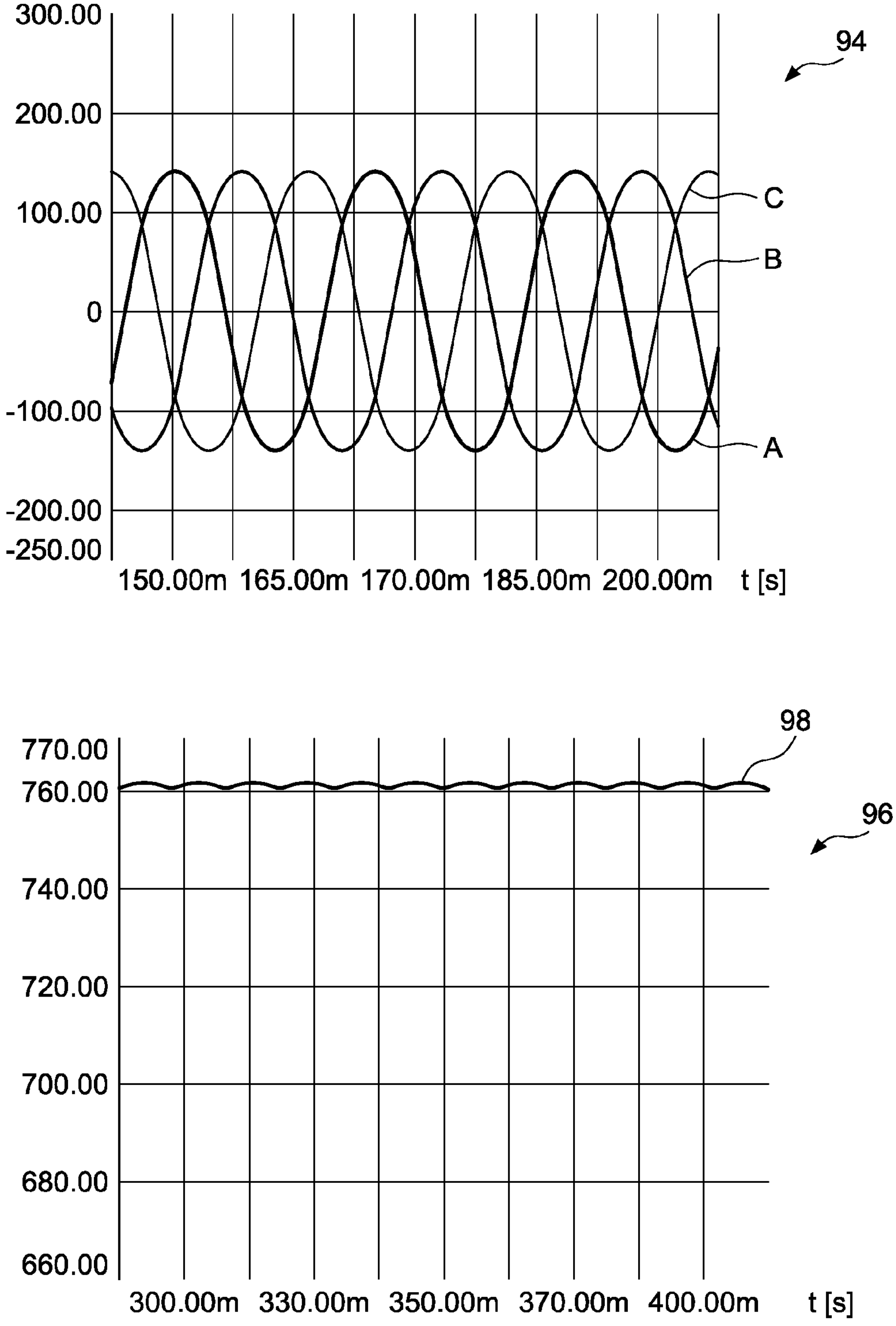
FIG. 5 is a graphical representation of input AC power and output power of a power system implemented according to aspects of the invention.

FIG. 5 is a graph depicting the power at the input and the output of the power system of FIG. 1. Graph 94 depicts the 3 phase input AC power generated by a 3 phase power source. The 3 phases of the input AC power are denoted by the letters A, B, and C, respectively. The 3 phase input power is provided to a transformer as described with reference to FIG. 3 and FIG. 4.

In one embodiment, input terminal of the transformer is adjusted such that a turns ratio of winding 58 of the first coil 32 is approximately 0.6736. The corresponding output DC bus voltage 98 is about 765 V as indicated in graph 96. Thus, the load can be operated at 480 V even with a 400 V input source voltages.

Figure 6:
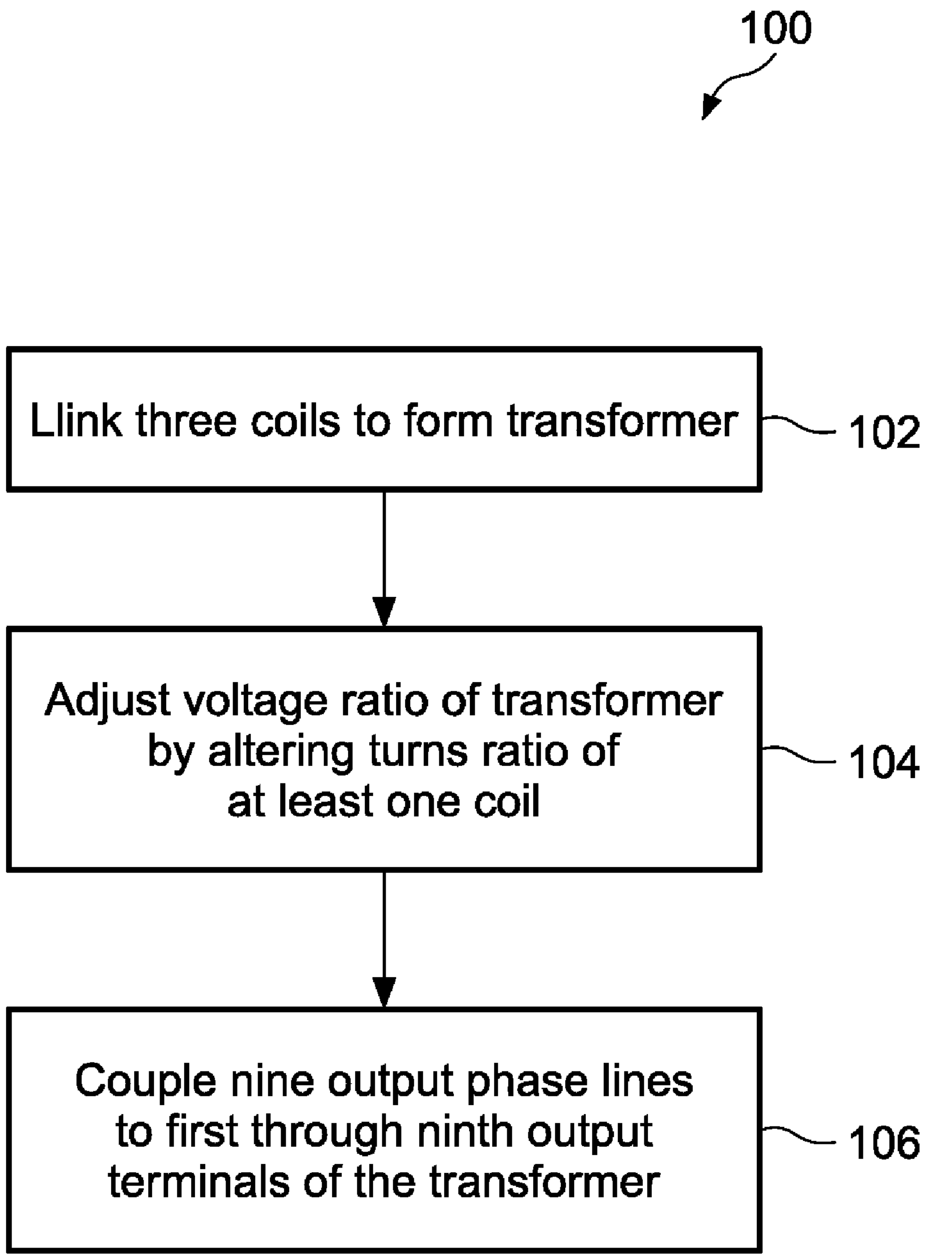
FIG. 6 is a flow chart illustrating an exemplary technique for making a transformer according to aspects of the present invention.

FIG. 6 is a flow chart illustrating one method for making a multi-phase transformer described above. The transformer is configured to generate a 9 phase output power from a 3 phase input power. The flow chart 100 describes one method by which the multi-phase transformer is constructed. Each step of the flow chart is described in detail below.

At step 102, first, second and third coils are linked together to form a transformer. Each coil includes a first, second, third, fourth and fifth windings. In one embodiment, the first, second and third coils are coupled together to form of a polygon as discussed above, such as a hexagon.

At step 104, a voltage ratio of the transformer is adjusted by adjusting at least one winding in the first, second or third coil. In one embodiment, the turns ratio of the second winding of the first coil is adjusted. In another embodiment, the turns ratio of the fourth winding of the first coil is adjusted.

At step 106, 9 output phase lines are coupled to first through ninth output terminals of the transformer. The output terminals are positioned at the intersection of the windings as shown in FIG. 3 and FIG. 4. The 9 output phase lines may be coupled to other electronic components such as rectifiers, filters and the like.

The above described invention has several advantages including operating the transformer as a step-up or step-down transformer without using additional windings. Also, the transformer can be operated for a load at a higher voltage than the input voltage. In addition, the transformer can be used to compensate output voltage drops, thereby decreasing system cable costs and also substantially reducing the need for an active front end converter to regulate the bus to a higher voltage level.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A transformer for converting 3 phase AC to 9 phase AC power, the transformer comprising:

first, second and third coils, each coil having a plurality of serial windings coupled together to form a polygon;

first, second and third input terminals each directly linked to a respective winding of the first, second and third coils, and configured to receive a first, second and third phases of input AC power, wherein at least one selected input terminal of the first, second and third input terminals is adjustable to alter a number of turns of the respective winding of the corresponding first, second or third coil on either side of the selected input terminal; and first through ninth output terminals linkable to first through ninth output power lines.

2. The transformer of claim 1, wherein each coil forms five separate windings including first, second, third, fourth and fifth windings.

3. The transformer of claim 2, wherein the polygon is a hexagon.

4. The transformer of claim 3, wherein the first and second windings of the first coil are coupled in series to form a first leg of the hexagon and the third through fifth windings of the first coil are coupled in series to form a fourth leg of the hexagon; and wherein the first, second and third windings of the second coil are coupled in series to form a second leg of the hexagon and the fourth and fifth windings of the second coil are coupled in series to form a fifth leg of the hexagon; and wherein the first and second windings of the third coil are coupled in series to form a third leg of the hexagon, and the third through fifth windings of the third coil are coupled in series to form a sixth leg of the hexagon.

5. The transformer of claim 4, wherein:

the first output terminal is positioned between the first and second windings of the first coil;

the second output terminal is positioned between first and second windings of the second coil;

the third output terminal is positioned between the second and third windings of the second coil;

the fourth output terminal is positioned between the first and second windings of the third coil, the fifth output terminal is positioned between the third and fourth windings of the first coil, the sixth output terminal is positioned between the fourth and fifth windings of the first coil, the seventh output terminal is positioned between the fourth and fifth windings of the second coil, the eighth output terminal is positioned between the third and fourth windings of the third coil; and the ninth output terminal is positioned between the fourth and fifth windings of the third coil.

6. The transformer of claim 4, wherein the first input terminal is adjustable to alter the number of windings on the second winding of the first coil.

7. The transformer of claim 4, wherein the third input terminal is adjustably positioned to alter the number of windings on the fourth winding of the first coil.

8. The transformer of claim 1, wherein at least one of the first, second and third input terminals is configured to adjust a voltage transfer ratio of the transformer.

9. The transformer of claim 8, wherein the voltage ratio is adjustable to operate the transformer as a step-up transformer or a step-down transformer.

10. A transformer for converting 3 phase AC to 9 phase AC power, the transformer comprising:

first, second and third coils, each coil having a plurality of serial windings coupled together to form a hexagon, wherein each coil comprises five separate windings including first, second, third, fourth and fifth windings;

first, second and third input terminals each linked to an exterior of a selected winding of one of the first, second and third coils, respectively, and configured to receive first, second and third phases of input power, wherein at least one of the first, second and third input terminals is adjustable to alter a turns ratio of the selected winding of the corresponding first, second or third coil; and first through ninth output terminals linkable to the first through ninth output power lines.

11. The transformer of claim 10, wherein the first and second windings of the first coil are coupled in series to form a first leg of the hexagon and the third through fifth windings of the first coil are coupled in series to form a fourth leg of the hexagon; and wherein the first, second and third windings of the second coil are coupled in series to form a second leg of the hexagon and the fourth and fifth windings of the second coil are coupled in series to form a fifth leg of the hexagon; and wherein the first and second windings of the third coil are coupled in series to form a third leg of the hexagon, and the third through fifth windings of the third coil are coupled in series to form a sixth leg of the hexagon.

12. The transformer of claim 11, wherein:

the first output terminal is positioned between the first and second windings of the first coil;

the second output terminal is positioned between first and second windings of the second coil;

the third output terminal is positioned between the second and third windings of the second coil;

the fourth output terminal is positioned between the first and second windings of the third coil, the fifth output terminal is positioned between the third and fourth windings of the first coil, the sixth output terminal is positioned between the fourth and fifth windings of the first coil, the seventh output terminal is positioned between the fourth and fifth windings of the second coil, the eighth output terminal is positioned between the third and fourth windings of the third coil; and the ninth output terminal is positioned between the fourth and fifth windings of the third coil.

13. The transformer of claim 10, wherein at least one of the first, second and third input terminals is configured to adjust a voltage transfer ratio of the transformer.

14. The transformer of claim 13, wherein the voltage ratio is adjustable to operate the transformer as a step-up transformer or a step-down transformer.

15. A method for making a transformer for converting 3 phase AC to 9 phase AC power, the method comprising:

linking first, second and third coils, each coil having a plurality of serial windings coupled together to form a transformer, wherein each coil comprises five separate windings including first, second, third, fourth and fifth windings;

adjusting a voltage ratio of the transformer by adjusting a position of a first input terminal on at least one winding of the first, second and third coils, thereby altering a number of a turns ratio of the at least one winding; and coupling 9 output phase lines to first through ninth output terminals of the transformer.

16. The method of claim 15, wherein the first, second and third coils are linked together in a hexagon shape.

17. The method of claim 16, comprising:

coupling the first and second windings of the first coil in series to form a first leg of the hexagon, and coupling the third through fifth windings of the first coil in series to form a fourth leg of the hexagon;

coupling the first, second and third windings of the second coil in series to form a second leg of the hexagon and the forth and fifth windings are coupled in series forming a fifth leg of the hexagon; and coupling the first and second windings of the third coil in series to form a third leg of the hexagon, and coupling the third through fifth windings in series to form a sixth leg of the hexagon.

18. The method of claim 15, wherein adjusting the position of the first input terminal alters a number of turns on either side of the first input terminal on the at least one winding.

19. The method of claim 15, wherein the turns ratio is adjusted by adjusting a position of a second input terminal to alter a number of turns on either side of the second input terminal on a second winding of the first, second and third coils.

20. The method of claim 15, wherein the voltage ratio is adjusted to operate the transformer as a step-up transformer or a step-down transformer.

* * * * *